United States Patent
Hock

(10) Patent No.: US 10,903,663 B2
(45) Date of Patent: Jan. 26, 2021

(54) BALANCING CIRCUIT FOR AN ULTRACAPACITOR MODULE

(71) Applicant: AVX Corporation, Fountain Inn, SC (US)

(72) Inventor: Joseph Hock, Surfside Beach, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 16/014,164

(22) Filed: Jun. 21, 2018

(65) Prior Publication Data

US 2019/0006858 A1    Jan. 3, 2019

Related U.S. Application Data

(60) Provisional application No. 62/527,139, filed on Jun. 30, 2017.

(51) Int. Cl.
*H02J 7/00* (2006.01)
*H02J 7/34* (2006.01)
(Continued)

(52) U.S. Cl.
CPC ............ *H02J 7/0016* (2013.01); *B60L 50/40* (2019.02); *H02J 7/345* (2013.01); *H01G 11/08* (2013.01); *H01G 11/14* (2013.01)

(58) Field of Classification Search
CPC ...... H02J 7/0016; H02J 7/345; H02J 2310/48; H02J 7/0021; B60L 50/40; H01G 11/14; H01G 11/08; Y02E 60/13; Y02T 10/70
(Continued)

(56) References Cited

U.S. PATENT DOCUMENTS 6,480,368 B1    11/2002 Lammers et al.
6,738,242 B1    5/2004 Okamura et al.
(Continued)

FOREIGN PATENT DOCUMENTS

EP     2 337 182 A2    6/2011
JP     H 0945490 A     2/1997
(Continued)

OTHER PUBLICATIONS

PCT International Search Report and Written Opinion for corresponding PCT Application No. PCT/US2018/038671, dated Oct. 12, 2018, 13 pages.
(Continued)

*Primary Examiner* — Zixuan Zhou
(74) *Attorney, Agent, or Firm* — Dority & Manning, P.A.

(57) ABSTRACT

Balancing circuits for an ultracapacitor module are provided. In some implementations, the balancing circuit can include a comparator. The comparator can have a sensing input. The comparator can be configured to compare an input voltage associated with the ultracapacitor received at the sensing input to a reference voltage and to provide an output via an output node of the comparator. The balancing circuit can include a switching circuit coupled to the ultracapacitor. The switching circuit can be controlled to discharge the ultracapacitor based at least in part on the output of the comparator circuit. The balancing circuit can further include a feedback element coupled between the switching circuit and the sensing input of the comparator.

17 Claims, 4 Drawing Sheets

(51) Int. Cl.
    *B60L 50/40*     (2019.01)
    *H01G 11/08*     (2013.01)
    *H01G 11/14*     (2013.01)

(58) Field of Classification Search
    USPC .................................................. 320/166, 167
    See application file for complete search history.

(56) References Cited

U.S. PATENT DOCUMENTS

| | | |
|---|---|---|
| 6,806,686 B1 | 10/2004 | Thrap |
| 6,943,529 B2 | 9/2005 | Cheiky et al. |
| 7,042,197 B2 | 5/2006 | Turner et al. |
| 7,342,768 B2 | 3/2008 | Doljack et al. |
| 7,345,454 B2 | 3/2008 | Thrap |
| 7,457,100 B2 | 11/2008 | Nakajima et al. |
| 7,474,879 B2 | 1/2009 | Turner et al. |
| 7,482,816 B2 | 1/2009 | Odajima et al. |
| 7,531,987 B2 | 5/2009 | Ohasi et al. |
| 7,599,167 B2 | 10/2009 | Doljack |
| 7,599,168 B2 | 10/2009 | Doljack et al. |
| 7,647,191 B2 | 1/2010 | Kakiuchi et al. |
| 7,660,084 B2 | 2/2010 | Kim et al. |
| 7,741,811 B2 | 6/2010 | Daio |
| 7,880,449 B2 | 2/2011 | Thrap |
| 7,969,121 B2 | 6/2011 | Smith et al. |
| 8,134,337 B2 | 3/2012 | Morita |
| 8,198,870 B2 | 6/2012 | Zuercher |
| 8,305,035 B2 | 11/2012 | Morita et al. |
| 8,411,413 B2 | 4/2013 | Eilertsen |
| 8,463,562 B2 | 6/2013 | Nakanishi |
| 8,686,662 B1 | 4/2014 | Bragg et al. |
| 9,018,922 B2 | 4/2015 | Morita et al. |
| 9,190,860 B2 | 11/2015 | Wright et al. |
| 9,209,653 B2 | 12/2015 | Maynard et al. |
| 9,515,510 B2 | 12/2016 | Newlin |
| 9,525,298 B1 | 12/2016 | Pham |
| 2002/0140405 A1 | 10/2002 | Malik |
| 2005/0052169 A1 | 3/2005 | Thrap |
| 2007/0216425 A1 | 9/2007 | Okamura et al. |
| 2009/0009177 A1 | 1/2009 | Kim et al. |
| 2009/0231764 A1 | 9/2009 | Banting et al. |
| 2009/0322289 A1 | 12/2009 | Zuercher |
| 2010/0039072 A1 | 2/2010 | Cegnar |
| 2010/0079109 A1 | 4/2010 | Eilertsen et al. |
| 2010/0283434 A1* | 11/2010 | Kakiuchi ............. H02J 7/0016 320/166 |
| 2011/0075457 A1* | 3/2011 | Thrap ................. H03K 17/0822 363/74 |
| 2012/0161710 A1* | 6/2012 | Mai ...................... B60L 58/26 320/118 |
| 2012/0176821 A1 | 7/2012 | Dunipace |
| 2014/0114592 A1 | 4/2014 | Eilertsen |
| 2016/0036248 A1* | 2/2016 | Hamada ................. B60L 3/12 320/166 |
| 2016/0126826 A1 | 5/2016 | Chao |
| 2016/0146173 A1 | 5/2016 | Mars et al. |
| 2016/0243960 A1 | 8/2016 | Wood et al. |
| 2016/0301221 A1 | 10/2016 | Kaminsky |
| 2017/0338669 A1 | 11/2017 | Hansen |

FOREIGN PATENT DOCUMENTS

| | | |
|---|---|---|
| JP | 5304654 | 10/2013 |
| JP | 2016-073046 | 5/2016 |
| KR | 100733394 | 6/2007 |
| KR | 100998661 | 12/2010 |
| KR | 100998661 B1 | 12/2010 |
| WO | WO 99/04476 | 1/1999 |
| WO | WO 2009-112069 | 9/2009 |
| WO | WO2009118119 | 10/2009 |
| WO | WO2009118120 | 10/2009 |
| WO | WO 2015/000017 A1 | 1/2015 |

OTHER PUBLICATIONS

PCT International Preliminary Report on Patentability for corresponding PCT Application No. PCT/US2018/038671, dated Dec. 31, 2019.

Supplementary European Search Report for EP Application No. 18 82 3324, dated Oct. 21, 2020, 7 pages.

* cited by examiner

BALANCING CIRCUIT FOR AN ULTRACAPACITOR MODULE

PRIORITY CLAIM

This application claims the benefit of priority of U.S. Provisional Patent Application Ser. No. 62/527,139, filed on Jun. 30, 2017, titled "Balancing Circuit for an Ultracapacitor Module," which is incorporated herein by reference.

BACKGROUND

Electrical energy storage cells are widely used to provide power to electronic, electromechanical, electrochemical, and other useful devices. A double layer ultracapacitor, for instance, can employ a pair of polarizable electrodes that contain carbon particles (e.g., activated carbon) impregnated with a liquid electrolyte. Due to the effective surface area of the particles and the small spacing between the electrodes, large capacitance values can be achieved. The individual double layer capacitors may be combined together to form a module having a raised output voltage or increased energy capacity.

SUMMARY

One example aspect of the present disclosure is directed to a balancing circuit for a capacitor, such as a double layer ultracapacitor. The balancing circuit can include a comparator. The comparator can have a sensing input. The comparator can be configured to compare an input voltage associated with the ultracapacitor received at the sensing input to a reference voltage and to provide an output via an output node of the comparator. The balancing circuit can include a switching circuit coupled to the ultracapacitor. The switching circuit can be controlled to discharge the ultracapacitor based at least in part on the output of the comparator circuit. The balancing circuit can further include a feedback element coupled between the switching circuit and the sensing input of the comparator.

Other features and aspects of the present disclosure are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figures in which.

Figure 1:
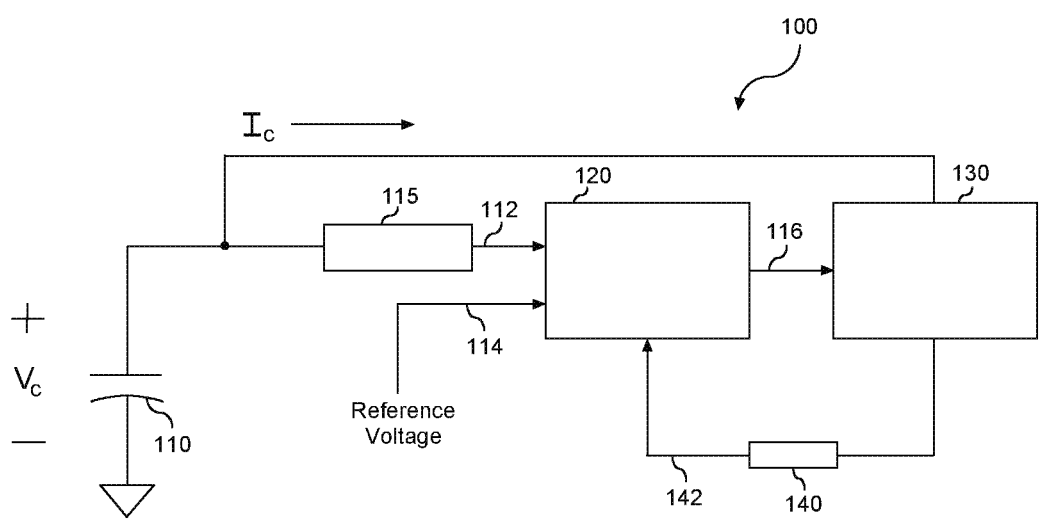
FIG. 1 depicts a block diagram of an example balancing circuit for an ultracapacitor according to example embodiments of the present disclosure.

Repeat use of reference characters in the present specification and drawing is intended to represent same or analogous features or elements of the disclosure.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present disclosure, which broader aspects are embodied in the exemplary construction.

Example aspects of the present disclosure are directed to balancing circuits for use with electrical energy storage cells, such as ultracapacitors. The balancing circuit can be used, for instance, to prevent overvoltage conditions from causing damage to the ultracapacitor. In some implementations, balancing circuits can help regulate the voltage across each ultracapacitor in an ultracapacitor module containing a plurality of ultracapacitors such that voltage across each ultracapacitor is regulated to substantially the same voltage.

In some embodiments, the balancing circuit for an ultracapacitor can include a comparator. The comparator can be configured to compare an input voltage associated with a voltage across the ultracapacitor with a reference voltage (e.g., a balance voltage for the ultracapacitor). The input voltage can be any signal or voltage indicative of the voltage across the ultracapacitor. In some embodiments, the input voltage can be provided using a voltage divider circuit. The input voltage can be received at a sensing input of the comparator (e.g., via the voltage divider circuit). The comparator can be configured to provide an output via an output node of the comparator based at least in part on the input voltage relative to the reference voltage. For instance, the comparator can be configured to provide a first output (e.g., a first logic output) via the output node when the input voltage is greater than the reference voltage. The comparator can be configured to provide a second output (e.g., a second logic output) via the output node when the voltage is associated with the ultracapacitor is not greater than the reference voltage.

The balancing circuit can further include a switching circuit. The switching circuit can be configured to discharge the ultracapacitor based on the output from the comparator. The switching circuit can include one or more switching elements and at least one dissipative element. The at least one dissipative element can be coupled to the ultracapacitor. The output of the comparator can be used to control the one or more switching elements to be in a conducting state when the voltage associated with the ultracapacitor exceeds the reference voltage. When the one or more switching elements are in the conducting state, a discharge current from the capacitor can flow through the at least one dissipative element, lowering the voltage of the ultracapacitor. In this way, the balancing circuit can reduce overvoltage conditions for the ultracapacitor.

According to example aspects of the present disclosure, the balancing circuit can include a feedback element coupled between the switching circuit and the sensing input of the comparator. The feedback element can be used to provide hysteresis for the comparator circuit. The hysteresis can prevent or reduce rapid switching (e.g., reduce a response time of switching) between the first output and the second output of the comparator during operation of the balancing circuits. As a result, the balancing circuit can protect from the ultracapacitor from overvoltage conditions with increased stability and without rapid cycling back and forth between discharging and not discharging of the ultracapacitor. This can, in some cases, reduce noise on the ultracapacitor.

Example aspects of the present disclosure are discussed with reference to an ultracapacitor. Details concerning an example ultracapacitor are provided herein. Those of ordinary skill in the art, using the disclosures provided herein, will understand that balancing circuits according to example aspects of the present disclosure can be used in conjunction with other energy storage devices without deviating from the scope of the present disclosure. The use of the term "about" in conjunction with a numerical value is intended to refer to within 20% of the stated amount.

One example embodiment of the present disclosure is directed to a balancing circuit for an ultracapacitor. The balancing circuit can include a comparator having a sensing input. The comparator can be configured to compare an input voltage associated with the ultracapacitor received at the sensing input to a reference voltage and to provide an output via an output node of the comparator. The balancing circuit further includes a switching circuit coupled to the ultracapacitor. The switching circuit is configured to discharge the ultracapacitor based at least in part on the output of the comparator. The balancing circuit can include a feedback element coupled between the switching circuit and the sensing input of the comparator.

In some embodiments, the comparator can be configured to provide a first output when the input voltage associated with the ultracapacitor is greater than the reference voltage and to provide a second output when the voltage associated with the ultracapacitor is not greater than the reference voltage. The switching circuit can include one or more switching elements. The one or more switching elements can be configured in a conducting state when the comparator provides the first output. The one or more switching elements can be configured in a non-conducting state when the comparator provides the second output. The ultracapacitor can be configured to discharge when the one or more switching elements are in a conducting state.

In some embodiments, the feedback element can include at least one resistor. The feedback element can be configured to provide hysteresis for the comparator. The hysteresis can be operable to reduce a response time of the comparator in switching between a first output and a second output of the comparator.

In some embodiments, the switching circuit can include one or more dissipative elements coupled to the ultracapacitor. The switching circuit can include a first switching element coupled to the one or more dissipative elements. The switching circuit can include a second switching element coupled to the first switching element. The output node of the comparator can be coupled to the first switching element. The feedback element can be coupled to a node between the first switching element and the second switching element.

In some embodiments, the first switching element can include a first bipolar junction transistor having a base, a collector, and an emitter. The second switching element can include a second bipolar junction transistor having a base, a collector, and an emitter. The output node of the comparator can be coupled to the base of the first bipolar junction transistor. The collector of the first bipolar junction transistor can be coupled to the base of the second bipolar junction transistor. In some embodiments, the first bipolar junction transistor can be a pnp transistor. The second bipolar junction transistor can be an npn transistor.

In some embodiments, the sensing input of the comparator is configured to receive the voltage associated with the ultracapacitor via a voltage divider circuit. In some embodiments, the sensing input is associated with a negative input for the comparator. The reference voltage is associated with a positive input for the comparator.

Another example embodiment of the present disclosure is directed to a method of controlling a voltage of an ultracapacitor. The method includes receiving, at a first input of a comparator, a first signal indicative of a voltage associated with an ultracapacitor. The method includes receiving, at a second input of a comparator, a signal indicative of a reference voltage. The method includes receiving, at the first input of the comparator, a feedback signal via a feedback element coupled between a switching circuit used to discharge the ultracapacitor and the comparator. The method includes controlling the switching circuit to discharge the ultracapacitor based at least in part on the feedback signal, the voltage associated with the ultracapacitor, and the reference voltage.

In some embodiments, the controlling the witching circuit to discharge the ultracapacitor based at least in part on the feedback signal, the voltage associated with the ultracapacitor, and the reference voltage comprises providing, by the comparator, a first output when the voltage associated with the ultracapacitor is greater than a reference voltage and providing, by the comparator, a second output when the voltage associated with the ultracapacitor is not greater than the reference voltage. Controlling the switching to discharge the ultracapacitor can include controlling one or more switching elements to be in a conducting state when the comparator provides the first output.

In some embodiments, the feedback signal can be configured to provide hysteresis for the comparator. The hysteresis can be operable to reduce a response time of the comparator in switching between a first output and a second output of the comparator.

Another example embodiment of the present disclosure is directed to a balancing circuit for an ultracapacitor. The balancing circuit can include a comparator having a sensing input. The comparator can be configured to compare an input voltage associated with the ultracapacitor received at the sensing input to a reference voltage and to provide an output via an output node of the comparator. The balancing circuit can include a switching circuit. The switching circuit can include one or more dissipative elements. The switching circuit can include a pnp transistor having a base, a collector, and an emitter and an npn transistor having a base, a collector, and an emitter. The one or more dissipative elements can be coupled to the ultracapacitor and to the emitter of the pnp transistor. The collector of the pnp transistor can be coupled to the base of the npn transistor. The output node of the comparator can be coupled to the base of the pnp transistor. A feedback element can be coupled to a node between the collector of the pnp transistor and the base of the npn transistor. The feedback element can be coupled to the sensing input of the comparator. In some embodiments, the feedback element can be configured to provide hysteresis for the comparator. The hysteresis can be operable to reduce a response time of the comparator in switching between a first output and a second output of the comparator.

Another example embodiment of the present disclosure is directed to an ultracapacitor module comprising a plurality of ultracapacitors coupled in series or parallel. Each ultracapacitor in the ultracapacitor module can be coupled to a balancing circuit. The balancing circuit can include one or more aspects of any of the example balancing circuits described herein, or variants thereof.

The figures are provided for purposes of illustration and discussion of example embodiments of the present disclosure. FIG. 1 depicts a block diagram of an example balancing circuit 100 for use with an ultracapacitor 110 according to example embodiments of the present disclosure. The balancing circuit 100 includes a comparator circuit 120. The comparator circuit 120 can receive a signal 112 (e.g., input voltage) indicative of a voltage Vc across the capacitor via an input circuit, such as a voltage divider 115. The comparator circuit 120 can also receive a signal 114 indicative of a reference voltage. In some embodiments, the reference voltage can be determined based a desired voltage at which the ultracapacitor is to be maintained.

The comparator circuit 120 can provide an output 116 based on the signal 112 indicative of the voltage Vc and the signal 114 indicative of the reference voltage. For instance, the comparator circuit 120 can provide a first logic output (e.g., logic high) when the signal 112 indicative of the voltage Vc across the ultracapacitor is greater than the signal 114 indicative of the reference voltage. The comparator circuit 120 can provide a second logic output (e.g., logic low) when the signal 112 indicative of the voltage Vc across the ultracapacitor is not greater than the signal 114 indicative of the reference voltage.

The output 116 can be provided to a switching circuit 130. The switching circuit 130 can include one or more switching elements. When the one or more switching elements are in a conducting state, the ultracapacitor can discharge (e.g., provide a discharge current Ic) through one or more dissipative elements, reducing the voltage across the ultracapacitor. The ultracapacitor can discharge until the signal 112 indicative of the voltage Vc across the ultracapacitor is reduced low enough so that the signal 112 is no longer greater than the signal 114 indicative of the reference voltage. At this point, the switching elements can be controlled to be in a non-conducting state and the ultracapacitor can stop discharging. In this way, the balancing circuit 100 can be used to regulate the voltage of the ultracapacitor and reduce overvoltage conditions.

The balancing circuit 100 can further include a feedback element 140 coupled between the switching circuit 130 and the comparator circuit 120. A feedback signal 142 associated with a state of the switching circuit 130 can be provided to the comparator circuit 120 via the feedback element 140. The feedback signal 142 provided through the feedback element 140 can provide hysteresis for the comparator circuit 120. The hysteresis can reduce the response time of the comparator circuit 120 to changes in the signal 112 so that a response time of the comparator in switching between a first output (e.g., logic high) and (e.g., logic low) is reduced and the balance circuit does not cycle too rapidly.

Figure 2:
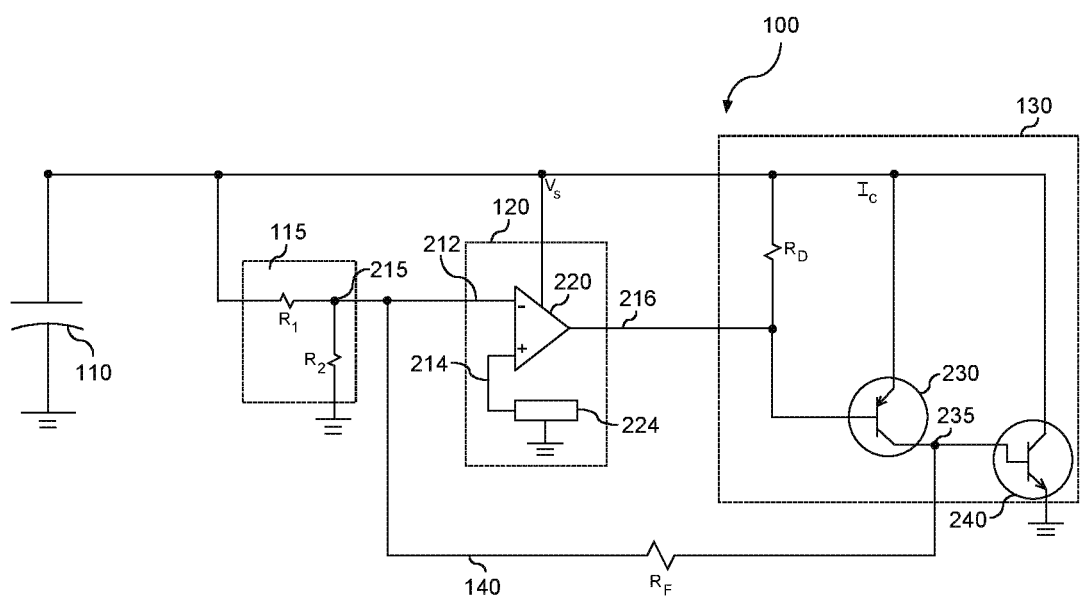
FIG. 2 depicts a circuit diagram of an example balancing circuit for an ultracapacitor according to example embodiments of the present disclosure.

FIG. 2 depicts a circuit diagram of an example implementation of the balancing circuit 100 according to example embodiments of the present disclosure. As shown, the balancing circuit 100 includes a voltage divider circuit 115, a comparator circuit 120, a switching circuit 120, and a feedback element 140. The balancing circuit 100 can be provided and configured using any method generally known in the art. In some embodiments, the balancing circuit 100 is provided on a circuit board (not shown), such as a printed circuit board.

The voltage divider circuit 115 can include a pair of resistors R1 and R2 coupled in series. A node 215 located between resistors R1 and R2 can be coupled to a sensing input 212 for a comparator 220. The voltage at node 215 can be an input voltage associated with and indicative of the voltage across the ultracapacitor 110. The voltage at node 215 can be related to the voltage across the ultracapacitor 110 based on the resistance values of resistors R1 and R2.

As shown, the comparator circuit 120 includes a comparator 220 that is powered at least in part using Vs from the ultracapacitor 110. The comparator 220 includes a sensing input 212 and a reference input 214. The input voltage (e.g., voltage at node 215) can be provided to the sensing input 212. A signal indicative of a reference voltage 224 can be provided to the reference input 214. The sensing input 212 can be a negative input for the comparator 220. The reference input 214 can be a positive input for the comparator 220. The comparator 220 provides an output via output node 216. The output node 216 can be coupled to the switching circuit 130 to control discharge of the ultracapacitor 110.

In some embodiments, the comparator circuit 120 (including comparator 220 and reference) can be a three-terminal device. The terminals can include an input terminal, an output terminal, and a ground terminal.

The switching circuit 130 includes a dissipative element (e.g., resistor $R_D$), a first switching element 230, and a second switching element 240. The first switching element 230 is a pnp bipolar junction transistor having a base, a collector, and an emitter. The second switching element 240 is an npn bipolar junction transistor having a base, a collector, and an emitter. Other switching elements (e.g., transistors, relays, etc.) can be used without deviating from the scope of the present disclosure.

The dissipative element $R_D$ is coupled to the base of the first switching element 230. The collector of the first switching element 230 is coupled to the base of the second switching element 240. The output node 216 of the comparator 220 is coupled to the base of the first switching element 230.

When the comparator 220 provides a first output (e.g., logic high) the first switching element 230 and the second switching element 240 are placed in a conducting state allowing discharge current Ic to flow from the ultracapacitor 110 through the dissipative element $R_D$. When the comparator 220 provides a second output (e.g., logic low) the first switching element 230 and the second switching element 240 are maintained in a non-conducting state.

The balancing circuit 100 includes a feedback element 140 with a feedback resistor $R_F$. A first end of the feedback element 140 is coupled to a node 235 located between the collector of the first switching element 230 and the base of the second switching element 240. A second end of the feedback element 140 is coupled to the sensing input 212 of the comparator 220. In this way, the feedback element 140 can provide hysteresis for the comparator 220 as discussed in more detail above.

The balancing circuits according to example embodiments of the present disclosure can be used in conjunction with an ultracapacitor module containing a plurality of ultracapacitors coupled in series or parallel. Any number of balancing circuits may be employed according to the present disclosure. For instance, the module contains at least one balancing circuit and in some embodiments at least two balancing circuits. However, it should be understood that the module may contain more balancing circuits. For instance, the module may contain 4 or more, such as 6 or more, such as 8 or more, and in some embodiments, from 8 to 30 individual balancing circuits. In some embodiments, there is at least one balancing circuit per ultracapacitor.

Figure 3:
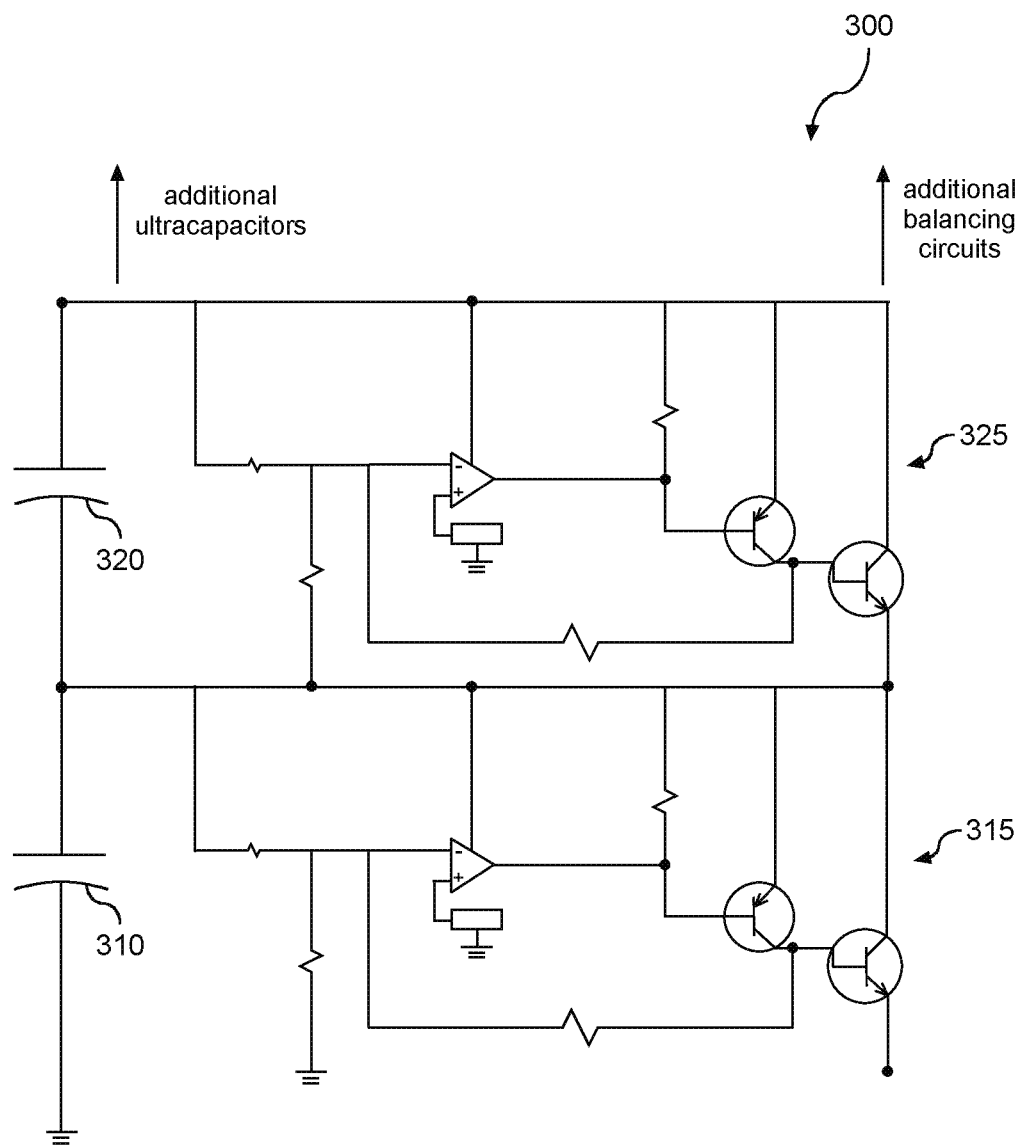
FIG. 3 depicts a circuit diagram of an example ultracapacitor system according to example embodiments of the present disclosure.

FIG. 3 depicts a portion of an example circuit diagram for an ultracapacitor module 300 having a plurality of ultracapacitors coupled in series with another. In FIG. 3, two ultracapacitors are illustrated, ultracapacitor 310 and ultracapacitor 320. Ultracapacitor 310 is coupled in parallel with balancing circuit 315. Ultracapacitor 320 is coupled in parallel with balancing circuit 325. Each balancing circuit 315 and 325 can be have the same configuration as balancing circuit 100 depicted in FIG. 2. This arrangement can be continued for additional ultracapacitors coupled in series with ultracapacitors 310 and 320. Any number of ultracapacitors can be included in the module 300, such as 2 or more ultracapacitors, 4 or more ultracapacitors, 6 or more ultracapacitors, 8 or more ultracapacitors, 10 or more ultracapacitors, etc.

Figure 4:
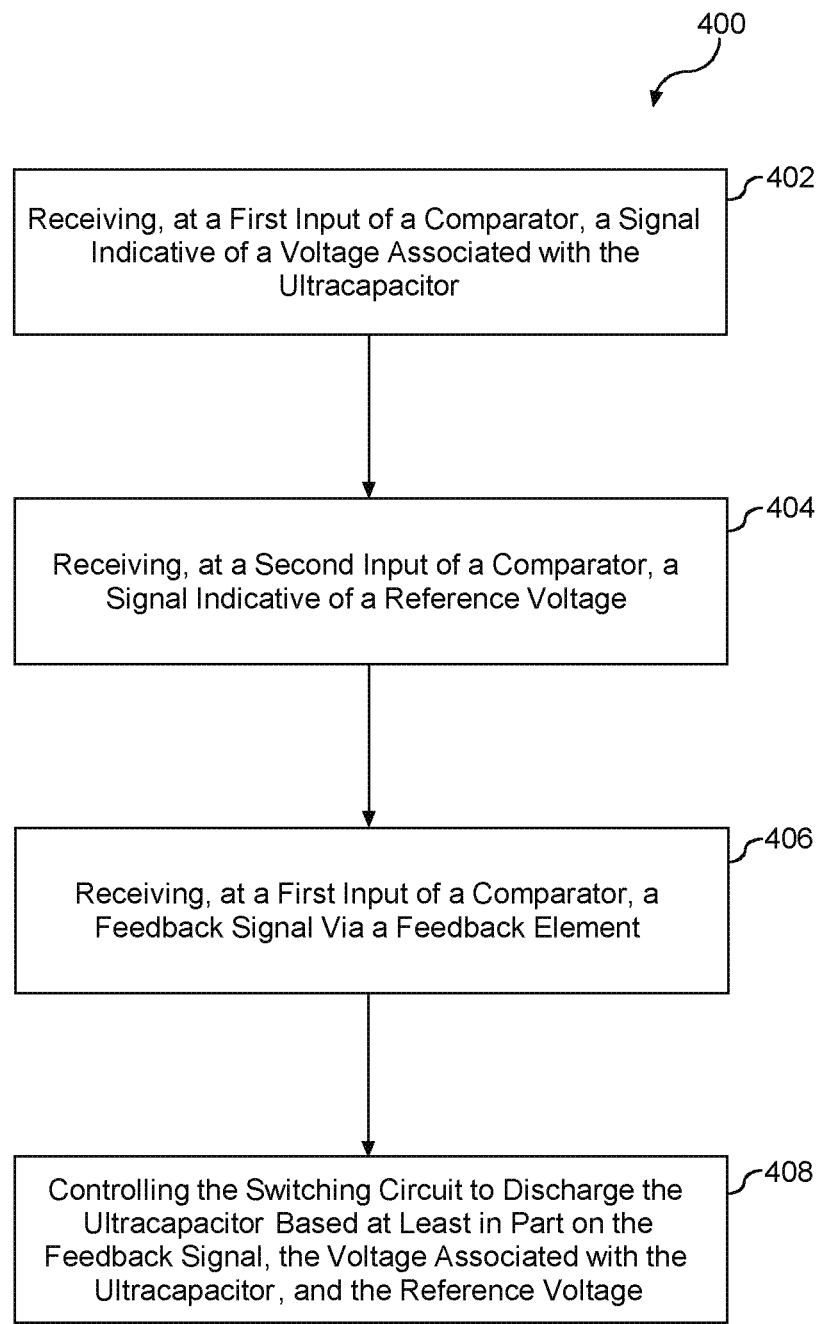
FIG. 4 depicts a flow diagram of an example method according to example embodiments of the present disclosure.

FIG. 4 depicts a flow diagram of an example method (400) according to example embodiments of the present disclosure. The method (400) can be implemented, for instance, using the balancing circuit depicted in FIGS. 1 and 2. FIG. 4 depicts steps performed in a particular order for purposes of illustration and discussion. Those of ordinary skill in the art, using the disclosures provided herein, will understand that various steps of any of the methods disclosed herein can be omitted, rearranged, performed simultaneously, expanded, modified, and/or adapted in various ways without deviating from the scope of the present disclosure.

At (402), the method includes receiving, at a first input of a comparator, a signal indicative of a voltage associated with the ultracapacitor. For instance, the comparator 220 of FIG. 2 can receive an input voltage at sensing input 212. In some embodiments, the signal indicative of the voltage associated with the ultracapacitor is an input voltage provided via a voltage divider.

At (404) of FIG. 4, the method includes receiving, at a second input of the comparator, a signal indicative of a reference voltage. For instance, the comparator 220 of FIG. 4 can receive an input signal associated with a reference voltage at input 214. The reference voltage can be selected based on a desired voltage for the ultracapacitor.

At (406) of FIG. 4, the method includes receiving, at the first input of the comparator, a feedback signal via a feedback element. For instance, the comparator 220 of FIG. 2 can receive a feedback signal via feedback element 140 at sensing input 212. The feedback element 140 can be coupled between a switching circuit 130 used to discharge the capacitor and the comparator 220.

At (408) of FIG. 4, the method can include controlling the switching circuit to discharge the ultracapacitor based at least in part on the feedback signal, the voltage associated with the ultracapacitor and the reference voltage. For instance, the comparator 220 of FIG. 2 can provide a first output (e.g., a first logic output) when the voltage associated with the ultracapacitor is greater than the reference voltage. The comparator can provide a second output (e.g., a second logic output) when the voltage associated with the ultracapacitor is not greater than the reference voltage. The switching elements 230 and 240 of the switching circuit 130 can be controlled to be in a conducting state to discharge the ultracapacitor when the comparator provides the first output. As discussed above, the feedback signal can provide hysteresis for the comparator. The hysteresis can reduce a response time of the comparator 220 in switching between the first output and the second output.

Any of a variety of different individual ultracapacitors may generally be employed in the module according to example aspects of the present disclosure. In some embodiments, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present disclosure. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and, in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and, in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 cm$^3$/g to about 1.5 cm$^3$/g, and in some embodiments, from about 0.4 cm$^3$/g to about 1.0 cm$^3$/g, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e..g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium Spiro compounds in which two or more rings are connected together by a Spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

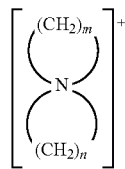

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present disclosure. The metal container may have any of a variety of different shapes, such as cylindrical, D-shaped, etc. Cylindrically-shaped containers are particular suitable.

The ultracapacitors may be connected in a variety of manners. For example, the ultracapacitors may be connected using an interconnect that attaches to or connects the respective terminals of the ultracapacitors. The interconnect may be made of a conductive material, such as a conductive metal. In one embodiment, the interconnect may be relatively flat or may be one having an increased surface area. Regarding the latter, the interconnect may have projections/protrusions or may also be formed from wires, braids, coils, etc. In this regard, the specific dimensions and configuration of the interconnects is not necessarily limited. Regardless of its form, any of a variety of different conductive materials may be employed, such as copper, tin, nickel, aluminum, etc., as well as alloys and/or coated metals. If desired, the conductive material may optionally be insulated with a sheath material.

The ultracapacitors may be electrically connected together in series or in parallel, depending on the particular properties desired. For instance, in one particular embodiment, the ultracapacitors may be electrically connected in series such that a terminal of a certain polarity (e.g., positive) of one ultracapacitor is connected to a terminal of opposite polarity (e.g., negative) of another ultracapacitor. For instance, the positive terminal may extend from a top portion of the first ultracapacitor and the negative terminal may extend from a bottom portion of the second ultracapacitor.

Ultracapacitors and modules containing them can be employed to store large amounts of electrical charge. As a result, the modules and ultracapacitors of the present disclosure can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). They also have a variety of applications in consumer electronics (e.g., portable media players, hand-held devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

What is claimed is:

1. A balancing circuit for an ultracapacitor, comprising:
a comparator comprising a sensing input, the comparator configured to compare an input voltage associated with the ultracapacitor received at the sensing input to a reference voltage and to provide an output via an output node of the comparator;
a switching circuit coupled to the ultracapacitor, wherein the switching circuit is configured to discharge the ultracapacitor based at least in part on the output of the comparator; and
a feedback element coupled between the switching circuit and the sensing input of the comparator, wherein the feedback element is configured to provide a feedback signal to the comparator;
wherein the feedback signal is associated with a state of the switching circuit, wherein the feedback signal reduces a response time of the comparator;
wherein the switching circuit comprises one or more dissipative elements coupled to the ultracapacitor, a first switching element coupled to the one or more dissipative elements, and a second switching element coupled to the first switching element, the output node of the comparator being coupled to the first switching element;
wherein the first switching element comprises a first bipolar junction transistor having a base, a collector, and an emitter, wherein the second switching element comprises a second bipolar junction transistor having a base, a collector, and an emitter, wherein the output node of the comparator is coupled to the base of the first bipolar junction transistor, wherein the collector of the first bipolar junction transistor is coupled to the base of the second bipolar junction transistor.

2. The balancing circuit of claim 1, wherein the comparator is configured to provide a first output when the input voltage associated with the ultracapacitor is greater than the reference voltage and to provide a second output when the voltage associated with the ultracapacitor is not greater than the reference voltage.

3. The balancing circuit of claim 2, wherein the switching circuit comprises one or more switching elements, wherein the one or more switching elements are configured to be in a conducting state when the comparator provides the first output and wherein the one or more switching elements are configured to be in a non-conducting state when the comparator provides the second output, wherein the ultracapacitor is configured to discharge when the one or more switching elements are in a conducting state.

4. The balancing circuit of claim 1, wherein the feedback element comprises at least one resistor.

5. The balancing circuit of claim 1, wherein the feedback element is configured to provide hysteresis for the comparator.

6. The balancing circuit of claim 5, wherein the hysteresis is operable to reduce the response time of the comparator in switching between a first output and a second output of the comparator.

7. The balancing circuit of claim 1, wherein the feedback element is coupled to a node between the first switching element and the second switching element.

8. The balancing circuit of claim 1, wherein the first bipolar junction transistor is a pnp transistor and the second bipolar junction transistor is an npn transistor.

9. The balancing circuit of claim 1, wherein the sensing input of the comparator is configured to receive the voltage associated with the ultracapacitor via a voltage divider circuit.

10. The balancing circuit of claim 1, wherein the sensing input is associated with a negative input for the comparator and the reference voltage is associated with a positive input for the comparator.

11. A method of controlling a voltage of an ultracapacitor, the method comprising:
receiving, at a first input of a comparator, a signal indicative of a voltage associated with an ultracapacitor;
receiving, at a second input of the comparator, a signal indicative of a reference voltage;
receiving, at the first input of the comparator, a feedback signal via a feedback element coupled between a switching circuit used to discharge the ultracapacitor and the comparator wherein the feedback signal is associated with a state of the switching circuit; and
controlling the switching circuit to discharge the ultracapacitor based at least in part on the feedback signal, the voltage associated with the ultracapacitor, and the reference voltage; wherein the feedback signal reduces a response time of the comparator;
wherein the switching circuit comprises one or more dissipative elements coupled to the ultracapacitor, a first switching element coupled to the one or more dissipative elements, and a second switching element coupled to the first switching element, the output node of the comparator being coupled to the first switching element;
wherein the first switching element comprises a first bipolar junction transistor having a base, a collector, and an emitter, wherein the second switching element comprises a second bipolar junction transistor having a base, a collector, and an emitter, wherein the output node of the comparator is coupled to the base of the first bipolar junction transistor, wherein the collector of the first bipolar junction transistor is coupled to the base of the second bipolar junction transistor.

12. The method of claim 11, wherein controlling the switching circuit to discharge the ultracapacitor based at least in part on the feedback signal, the voltage associated with the ultracapacitor, and the reference voltage comprises:
providing, by the comparator, a first output when the voltage associated with the ultracapacitor is greater than the reference voltage;

providing, by the comparator, a second output when the voltage associated with the ultracapacitor is not greater than the reference voltage.

13. The method of claim 12, wherein the feedback signal is configured to provide hysteresis for the comparator.

14. The method of claim 13, wherein the hysteresis is operable to reduce the response time of the comparator in switching between the first output and the second output of the comparator.

15. The method of claim 12, wherein controlling the switching circuit to discharge the ultracapacitor comprises controlling one or more switching elements to be in a conducting state when the comparator provides the first output.

16. A balancing circuit for an ultracapacitor, the balancing circuit comprising:
   a comparator having a sensing input, the comparator configured to compare an input voltage associated with the ultracapacitor received at the sensing input to a reference voltage and to provide an output via an output node of the comparator;
   a switching circuit, the switching circuit comprising:
      one or more dissipative elements;
      a pnp transistor having a base, a collector, and an emitter, the output node of the comparator being coupled to the pnp transistor;
      an npn transistor having a base, a collector, and an emitter;
   wherein the one or more dissipative elements are coupled to the ultracapacitor and to the emitter of the pnp transistor, the collector of the pnp transistor is coupled to the base of the npn transistor, the output node of the comparator is coupled to the base of the pnp transistor,
   wherein the balancing circuit further comprises a feedback element coupled to a node between the collector of the pnp transistor and the base of the npn transistor, the feedback element coupled to the sensing input of the comparator, wherein the feedback element is configured to provide a feedback signal from the node to the comparator;
   wherein the feedback signal is associated with a state of the switching circuit, wherein the feedback signal reduces a response time of the comparator.

17. The balancing circuit of claim 16, wherein the feedback element is configured to provide hysteresis for the comparator circuit, the hysteresis operable to reduce the response time of the comparator in switching between a first output and a second output.

* * * * *